Aug. 26, 1930.    N. McKNIGHT    1,774,448
AUTOMOBILE HEATER AND VENTILATOR
Filed Nov. 14, 1928    2 Sheets-Sheet 1
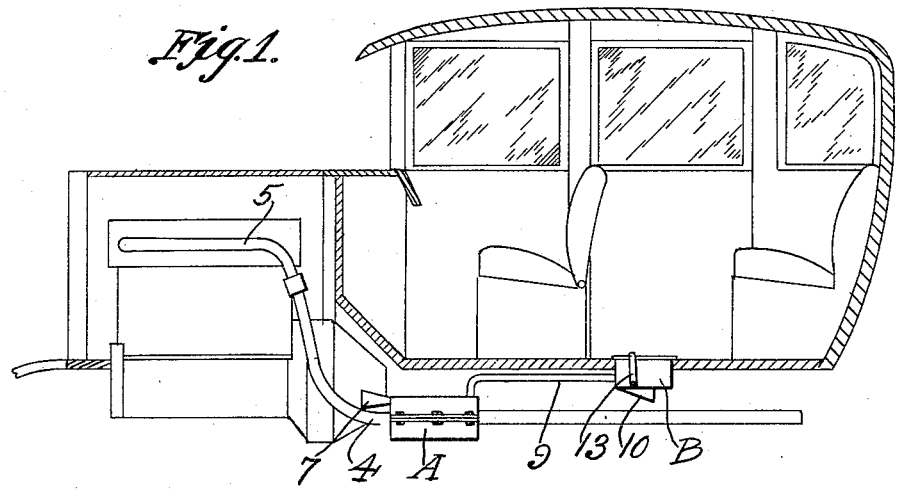
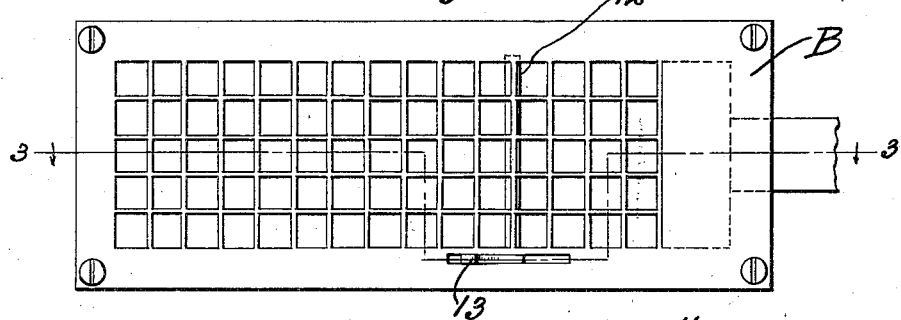
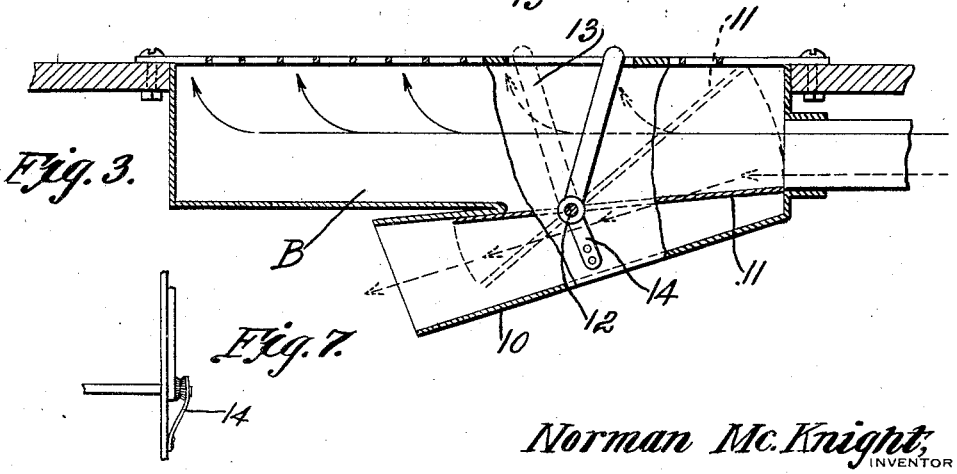
Norman Mc.Knight,
INVENTOR

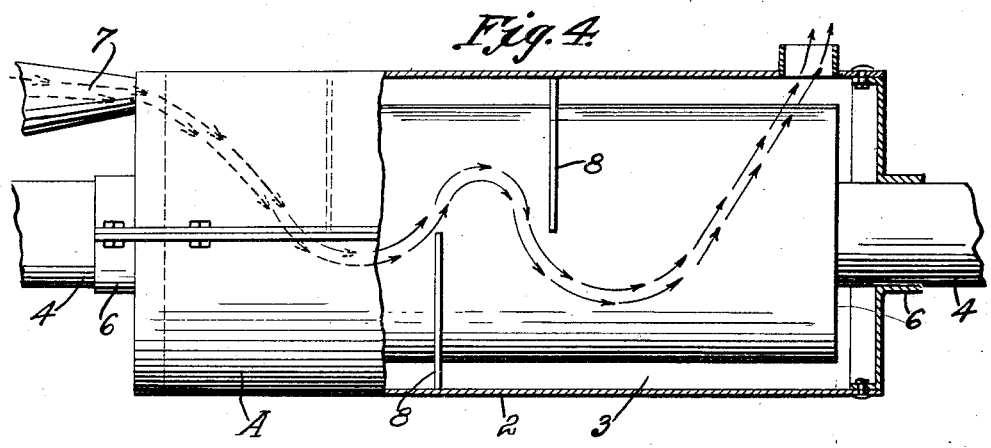
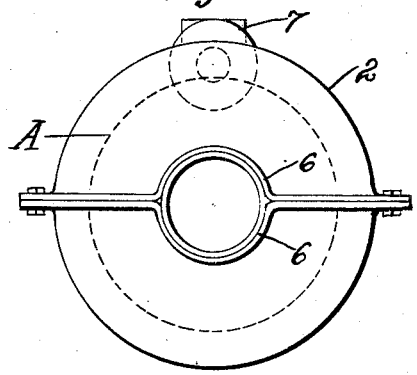
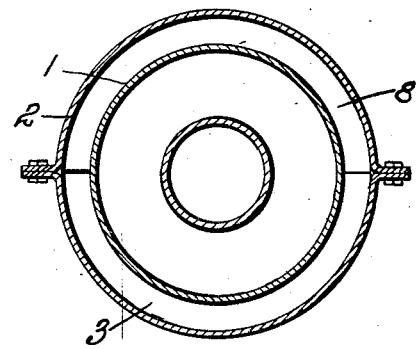

Patented Aug. 26, 1930

1,774,448

UNITED STATES PATENT OFFICE

NORMAN McKNIGHT, OF ZELIENOPLE, PENNSYLVANIA

AUTOMOBILE HEATER AND VENTILATOR

Application filed November 14, 1928. Serial No. 319,385.

This invention relates to a heater and ventilator for motor vehicles, an object of the invention being to provide an air heater so arranged that the air is drawn in from the exterior of the heater and at a point where it will not be mixed with the gases from the engine, with means for heating the air as it passes through the heater by the exhaust gases from the engine.

Another object of the invention is to provide a register into which the heated air is delivered, with means associated with the register for drawing air from the interior of the vehicle so as to ventilate the same and at the same time preventing the heated air from entering the vehicle or for closing the ventilating means and permitting the heated air to enter the vehicle.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a sectional view through a vehicle, showing the invention in use.

Figure 2 is a plan view of the register.

Figure 3 is a sectional view through a portion of the bottom of the vehicle and through the register.

Figure 4 is an elevation with parts broken away, of the air heater.

Figure 5 is an end view of the air heater.

Figure 6 is a transverse sectional view through the heater.

Figure 7 is a detail view showing the means for frictionally holding the valve in either one of its two positions.

In these views, A indicates the air heater and B the register, the register being preferably placed in the floor of the body of the vehicle and the heater arranged under the floor and to one side of the engine. This heater is composed of the inner cylinder 1 and the outer cylinder 2, these cylinders being spaced apart to form an air space 3 between them. The inner cylinder is arranged in the exhaust pipe 4 which leads from the exhaust manifold 5 of the engine so that the walls of this inner cylinder will be heated by the exhaust gases passing from the engine. The outer cylinder is formed with the nipples 6 on its ends which embrace the two sections of the exhaust pipe and at the front end of the outer cylinder at the top thereof, a funnel 7 is arranged for delivering air into the space 3. Baffles 8 are arranged in said space for causing the air to take a zigzag path through the space between the two cylinders and this air passes from the rear end of the space through the pipe 9 which delivers the air into the register B so that said air will escape into the interior of the body of the vehicle. This register has a depending funnel-shaped part 10 on its bottom which extends rearwardly and downwardly so that as the vehicle travels along, the air flowing past the member 10 will create a suction in said member and the register and thus air will be drawn from the body of the vehicle so that the vehicle will be ventilated.

A flat valve 11 has its shaft 12 pivoted in the lower part of the register in such a manner that in one position of the valve, the funnel-shaped member will be closed to the register, while the rear end of the pipe 9 will be free to deliver the heated air into the register, but in another position of the valve, the register will be in communication with the funnel-shaped member 10 and heated air from the pipe 9 will be prevented from passing through the register. A handle 13 is connected with the valve whereby the same can be moved from one position to another and friction means, shown generally at 14, are provided for holding the handle and valve in one position or the other.

From the foregoing it will be seen that the pure air entering the heater A will be highly heated by the exhaust gases passing through the inner cylinder and that this air will pass into the register and thus into the vehicle and heat the interior of the same. Whenever it is desired to ventilate the interior of the vehicle, it is simply necessary to move the valve from the full line position shown in Figure 3 to the dotted line position so as to permit the air in the vehicle to be drawn through the member 10 by the suction created therein, as before described.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In a motor vehicle, a register in the floor thereof, a rearwardly and downwardly extending funnel-shaped part on the bottom of the register whereby air currents passing the register will create a suction within the same, a heater pipe connected with the register and a valve in the register which, in one position, will close the register end of the heater pipe and open the suction member and in another position will close the suction member and open the heater pipe.

In testimony whereof I affix my signature.

NORMAN McKNIGHT.